United States Patent [19]

Spix et al.

[11] Patent Number: 5,253,359
[45] Date of Patent: Oct. 12, 1993

[54] CONTROL AND MAINTENANCE SUBSYSTEM NETWORK FOR USE WITH A MULTIPROCESSOR COMPUTER SYSTEM

[75] Inventors: George A. Spix; Glen L. Collier; G. Joseph Throop, all of Eau Claire; David L. Clounch, Chippewa Falls; Cris J. Rhea, Eau Claire; Douglas R. Beard, Eleva, all of Wis.

[73] Assignee: Supercomputer Systems Limited Partnership, Eau Claire, Wis.

[21] Appl. No.: 535,901

[22] Filed: Jun. 11, 1990

[51] Int. Cl.⁵ .............................................. G06F 11/00
[52] U.S. Cl. .................................... 395/575; 364/267; 364/267.6; 364/285; 364/276.8; 364/DIG. 1; 371/18
[58] Field of Search ............... 395/800, 575, 200, 275, 395/325; 371/18

[56] References Cited

U.S. PATENT DOCUMENTS

| | | | |
|---|---|---|---|
| 4,030,072 | 6/1977 | Bjornsson | 395/775 |
| 4,695,946 | 9/1987 | Andreasen | 395/575 |
| 4,873,626 | 10/1989 | Gifford | 364/200 |
| 4,891,751 | 1/1990 | Call | 395/800 |

Primary Examiner—Thomas C. Lee
Assistant Examiner—Eric Coleman
Attorney, Agent, or Firm—Patterson & Keough

[57] ABSTRACT

Methods and apparatus for a maintenance and control system for sensing and controlling the numerous sections of a highly parallel multiprocessor system. The control and maintenance system communicates with all processors, all peripheral systems, all user interfaces to the multiprocessor system, a system console, and the power and environmental control subsystems.

4 Claims, 6 Drawing Sheets

CONTROL AND MAINTENANCE SUBSYSTEM NETWORK FOR USE WITH A MULTIPROCESSOR COMPUTER SYSTEM

RELATED APPLICATIONS

This application is a related to a co-pending application filed in the U.S. Patent and Trademark Office concurrently with the present application, entitled INTEGRATED DEVELOPMENT AND MAINTENANCE SOFTWARE SYSTEM, Ser. No. 07/535881, and assigned to the assignee of the present invention, which is hereby incorporated by reference in the present application. This application is also related to a pending application filed in the U.S. Patent and Trademark Office on Dec. 29, 1989, entitled CLUSTER ARCHITECTURE FOR A HIGHLY PARALLEL SCALAR/VECTOR MULTIPROCESSOR SYSTEM, Ser. No. 07/459,083, assigned to the assignee of the present invention, and which is also hereby incorporated by reference.

TECHNICAL FIELD

This invention relates generally to the field of maintenance and control of computer systems. More particularly, it relates to an integrated system for controlling and maintaining a high-speed supercomputer and its peripheral devices using a number of maintenance control units connected to the various sections of the computer system.

BACKGROUND ART

Various high-speed computer processing systems, sometimes referred to as supercomputers, have been developed to solve a variety of computationally intensive applications, such as weather modeling, structural analysis, fluid dynamics, computational physics, nuclear engineering, real-time simulation, signal processing, etc. The overall design or architectures for such present supercomputers can be generally clasified into one of two broad categories: minimally parallel processing systems and massively parallel processing systems.

The minimally parallel class of supercomputers includes both uniprocessors and shared memory multiprocessors. A uniprocessor is a very high-speed processor that utilizes multiple functional elements, vector processing, pipeline and look-ahead techniques to increase the computational speed of the single processor. Shared-memory multiprocessors are comprised of a small number of high-speed processors (typically two, four or eight) that are tightly-coupled to each other and to a common shared-memory using either a bus-connected or direct-connected architecture.

At the opposite end of the spectrum, the massively parallel class of supercomputers includes both array processors and distributed-memory multicomputers. Array processors generally consist of a very large array of single-bit or small processors that operate in a single-instruction-multiple-data (SIMD) mode, as used for example in signal or image processing. Distributed-memory multicomputers also have a very large number of computers (typically 1024 or more) that are loosely-coupled together using a variety of connection topologies such as hypercube, ring, butterfly switch and hypertrees to pass messages and data between the computers in a multiple-instruction-multiple-data (MIMD) mode.

Because of the inherent limitations of the present architectures for minimally parallel and massively parallel supercomputers, such computer processing systems are unable to achieve significantly increased processing speeds and problem solving spaces over current systems. The related applications identified above entitled CLUSTER ARCHITECTURE FOR A HIGHLY PARALLEL SCALAR/VECTOR MULTIPROCESSOR SYSTEM sets forth a new cluster architecture for interconnecting parallel processors and associated resources that allows the speed and coordination of current minimally parallel multiprocessor systems to be extended to larger numbers of processors, while also resolving some of the synchronization problems associated with massively parallel multicomputer, systems. This range between minimally parallel and massively parallel systems will be referred to as highly parallel computer processing systems and can include multiprocessor systems having sixteen to 1024 processors. The cluster architecture described in the related application provides for one or more clusters of tightly-coupled, high-speed processors capable of both vector and scalar parallel processing that can symmetrically access shared resources associated with the cluster, as well as shared resources associated with other clusters.

Just as the traditional system architectures were ill-suited for solving the problems associated with highly parallel multiprocessor systems, so too are the traditional control and maintenance architectures. As used within the present specification, the terms control and maintenance refer to any operation by which a system operator can control the operation of the system such as starting, stopping, or n-stepping the master clock, setting or sensing internal machine states, executing diagnostic routines, and capturing errors at run-time for later display and analysis.

Prior art control and maintenance architectures include the use of scan paths for setting and/or sensing critical internal machine parameters. Control of the scan paths is typically via an external maintenance or diagnostic system. As computer execution speeds increase and systems become more densely packaged, physical access to critical internal machine parameters becomes more difficult, accentuating the need for remote electronic access to these parameters.

In highly parallel multiprocessor systems, the packaging density of the design requires that all internal machine registers be accessible to a control and maintenance subsystem. High performance systems use high clock speeds, requiring an increased packaging density, which in turn renders physical access to the system for sensing with traditional test equipment such as oscilloscopes and logic analyzers very difficult if not impossible. In addition, these traditional diagnostic tools may well be incapable of operating at a high enough speed to be useful.

Furthermore, the complexity of a highly parallel multiprocessor system makes analysis of failing machine sequences extremely difficult unless all internal registers can be sensed by the maintenance subsystem. The amount of information that must be retrieved from a highly parallel multiprocessor system undergoing diagnostic testing is massive, and easily exceeds the capability of traditional scan path architectures. Access to all internal machine registers is also necessary to provide the system with the ability to restart from a specific machine state, such as after stopping the machine in an error situation.

The ability to stop and restart the machine necessarily requires that the maintenance subsystem have the ability to control all processor clocks. In addition, a highly parallel multiprocessor architecture requires that control over processor machine states and clocks be independent. This is necessary for removing a defective processor from operation without halting operation of the entire system. By the same reasoning, it is advantageous for the maintenance system to have control over the power up sequence of each processor, so that a defective processor may be removed from operation, repaired, and restored to operation with minimal impact on the rest of the system.

In the same way that it is undesirable for maintenance work on one processor to halt operation of the entire system, so is it undesirable for maintenance work on one peripheral device to halt operation of the entire system. Thus it is desirable for a control and maintenance subsystem to have independent control over peripheral devices, including their on-line status and power up sequence.

It is clear that there is a need for a control and maintenance architecture specifically designed for the needs of a highly parallel multiprocessor system. Specifically, there is a need for a maintenance subsystem allowing setting and sensing capability for all internal machine registers, the ability to set and sense machine states by management of massive amounts of information, independent control of processor power up sequences, processor clocks, processor machine states, and peripheral devices.

SUMMARY OF THE INVENTION

The present invention is directed toward a control and maintenance architecture providing an integrated hardware and software solution to the problem of access to and control over the internal machine registers of a highly parallel multiprocessor system. This is accomplished by providing multiple Maintenance Control Units (MCUs), each of which is a computer workstation or other processing device, and all of which are connected together network via Ethernet or some other networking method. The MCUs are distributed to various portions of the system, such as the processor clusters, the disk subsystem, the tape subsystem, the power distribution subsystem, the user network interface, the system channel interface, and any other appropriate subsystems. In addition, there is a master/logging MCU for coordinating the MCUs' activities, and for gathering error logs from the various MCUs and a maintenance console providing an interface with a maintenance operator.

An operator working on the maintenance console, can log onto any of the distributed MCUs via the network interconnection, and execute diagnostic programs or perform other control functions on the desired subsystem, or can log onto the MCUs associated with the system processors so as to set or sense internal states of the processors. In addition, the operator can log onto one or more of the system processors themselves, such as for the purpose of executing self diagnostic routines.

In a preferred embodiment of the present invention, the master/logging MCU can operate as a file server and can store any or all of the programs to be run on any of the MCUs, and can store start up code for the processors themselves. Scan paths allow processor MCUs access to each of the processors, and through these scan paths the processors can be initialized upon powerup with code stored in the master/logging MCU, and can be set and sensed for diagnostic purposes. A backup master MCU is available in the event that the master/logging MCU fails.

In addition, each of the other MCUs may have disk storage of their own, such as for storage of logging information in the event that it cannot be sent to the master/logging MCU due to MCU, network, or other failure.

The software portion of the maintenance system according to a preferred embodiment of the present invention includes various testing routines for testing various portions of the multiprocessor system, including the peripheral and other subsystems. The architecture of the software subsystem is such that a given routine can be executed against multiple targets, including actual hardware (such as a multiprocessor cluster), and a computer simulation of the hardware. Thus a common operator interface is provided to engineering development tools such as simulators, manufacturing tools such as subsystem testers, and actual system hardware.

Accordingly, it is an objective of the present invention to provide a control and maintenance architecture specifically designed for the needs of a highly parallel multiprocessor system, and which provides setting and sensing capability for all internal machine registers.

Another objective of the present invention is to provide the ability to set and sense machine states by providing a maintenance architecture capable of managing the massive amount of information associated with a highly parallel multiprocessor system.

A further object of the present invention is to provide independent control of processor power up sequences, processor clocks, processor machine states, and peripheral devices through a distributed maintenance architecture.

A still further object of the present invention is to provide an architecture for a control and maintenance subsystem, where control and diagnostic routines can be executed on any of the multiple MCUs distributed throughout the multiprocessor system, and where these programs can be controlled from a single maintenance console.

A still further object of the present invention is to provide a common operator interface between actual system hardware and engineering and development tools such as computer simulators and subsystem testers.

These and other objectives of the present invention will become apparent with reference to the drawings, the detailed description of the preferred embodiment and the appended claims.

DESCRIPTION OF THE PREFERRED EMBODIMENTS

Figure 1:
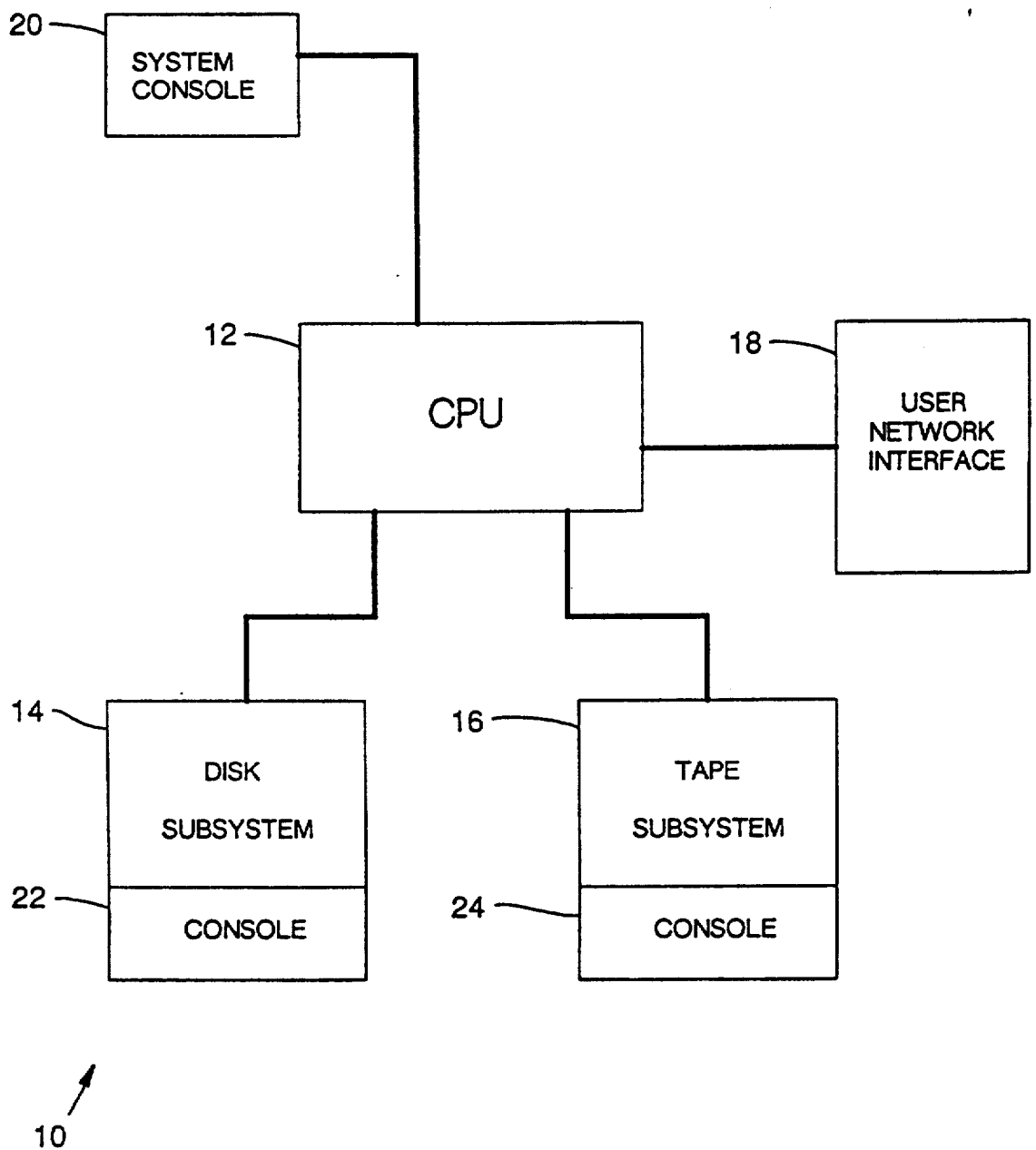
FIG. 1 shows a computer and peripheral architecture typical of those found in the prior art.

Referring now to FIG. 1, a block diagram of a typical prior art computer system 10 is shown. A Central Processing Unit (CPU) 12 is connected to various peripheral devices including a disk subsystem 14, a tape subsystem 16, an interface to the user network 18, and the system console 20. To the extent that maintenance operations are to be performed on the various components of the system, a console is provided for the component, such as a disk subsystem console 22 and tape subsystem console 24. These consoles 22, 24 may be permanently installed, or may be a terminal temporarily attached for the duration of the maintenance operations to be performed.

Such an architecture does not readily lend itself to the needs of a high performance multiprocessor system for several reasons. With separate consoles 20, 22, 24 and segregated control of CPU 12 and peripherals 14, 16, coordination of peripheral maintenance with CPU 12 operations is difficult and results in a substantial impact upon system operation. For example, if an error develops on a disk drive, the operator must first halt the CPU 12, then move to the disk subsystem console 22 to perform the maintenance tasks, and then restart the CPU 12 from the system console 20. This results in substantial down time for the system 10 and a corresponding impact on execution of user programs.

With high performance supercomputers such as highly parallel multiprocessor systems, execution time is expensive, and routine maintenance operations are ideally performed with minimal impact of system execution.

Figure 2:
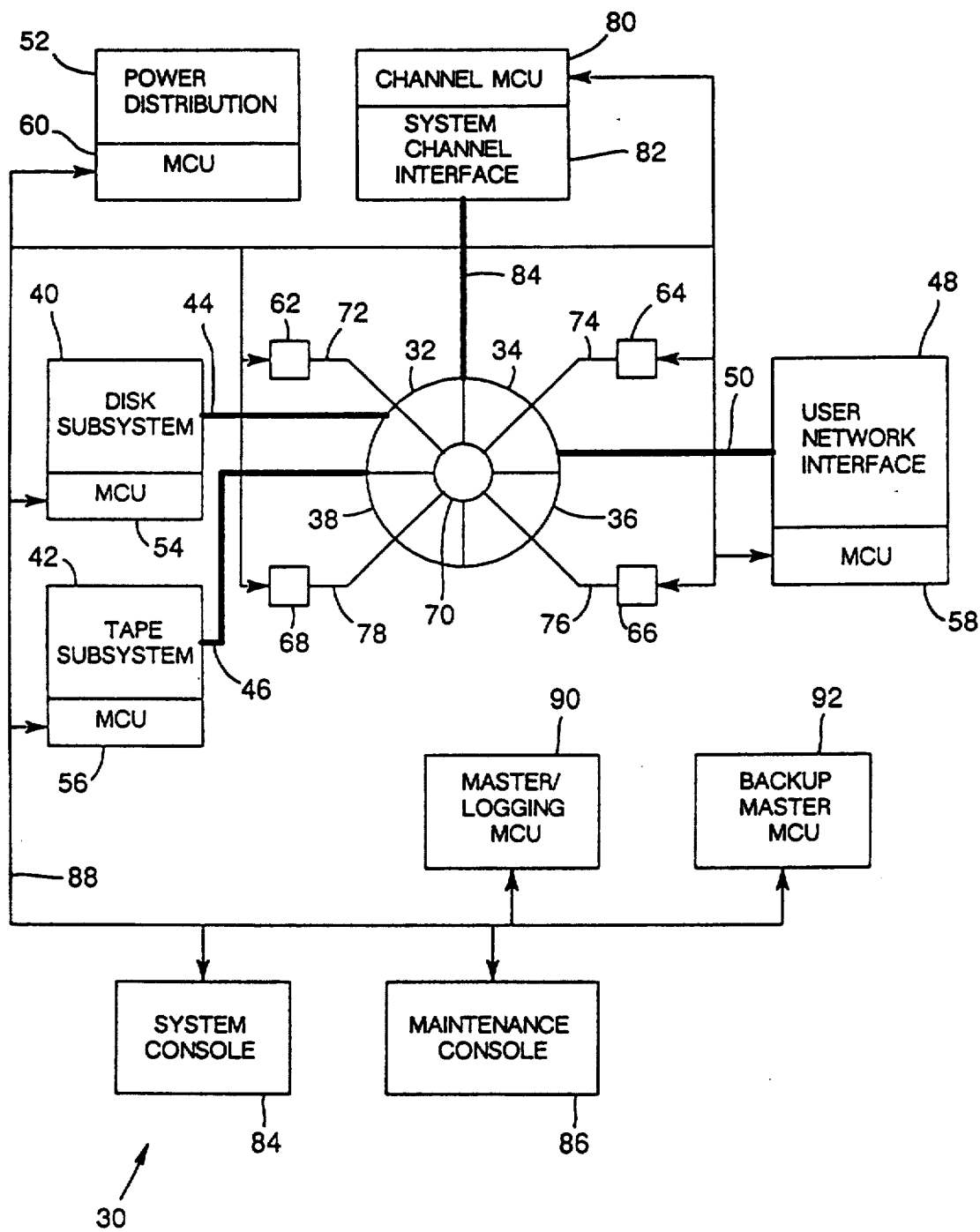
FIG. 2 shows a block diagram of a highly parallel multiprocessor system architecture according to a preferred embodiment of the present invention.

Referring now to FIG. 2, a block diagram of a computer system maintenance architecture 30 according to a preferred embodiment of the present invention is shown. Multiple processors are connected in a highly parallel multiprocessor configuration, and they are grouped in clusters 32, 34, 36, 38. Associated with each cluster is an Input/Output Concentrator (IOC) and a Secondary Memory System (SMS) (not shown). Peripheral subsystems include a disk subsystem 40 and a tape subsystem 42, each of which may contain many disk or tape drive units, and both of which are connected to the clusters 32-38 through high speed interfaces 44, 46, such as the High Performance Peripheral Interface (HPPI). A user network interface 48 is also connected to the clusters 32-38 through a high speed interface 50. Power distribution and environmental control (cooling, etc.) is managed by the power distribution subsystem 52, which can independently sequence power to processors within one of the clusters 32-38, and to any of the subsystems.

Maintenance Control Units (MCUs) are connected to every subsystem and processor cluster in the system. A disk MCU 54 is connected to the disk subsystem 40, and controls disk maintenance operations by communicating with disk controllers in the disk subsystem (not shown), each of which may support a string of drives. A tape MCU 56 operates in a similar fashion to the disk MCU 54, and controls maintenance operations on the tape subsystem 42. A user network MCU 58 controls the maintenance operations of the user network interface 48, and power distribution MCU 60 controls the power distribution subsystem 52.

Four processor MCUs, 62, 64, 66, 68 are associated with the four processor clusters 32-38, and connect to the clusters through a clock tower 70 via interfaces 72, 74, 76, 78 which in the preferred embodiment of the present invention are TTL busses, but which could be any interface capable of providing the necessary data throughput. Interfaces 72-78 also connect processor MCUs 62-68 to the IOC and SMS associated with each cluster 32-38, and references to the connection between processor MCUs 62-68 and clusters 32-38 hereinafter also refer to the connection to the associated IOC and SMS.

High speed supercomputers are typically implemented using Emitter Coupled Logic (ECL) devices, which have limitations on interconnect lengths. Since the processor MCUs 62-68 interact directly with processor hardward in ECL, they are preferably connected to the clusters 32-38 through some centrally located point, so as to minimize interconnect lengths. In a preferred embodiment of the present invention, the processor MCUs 62-68 connect to the clusters 32-38 through the clock tower 70 which is centrally located. In an alternate embodiment of the present invention, the MCUs 62-68 connect to the clusters 32-38 through a separate cabinet.

There is also channel MCU 80 which connects through a system channel interface 82 to the processor clusters 32-38 through a high speed interface 84 such as HPPI. This interface allows channel MCU 80 to communicate with the operating system that is executing on the processor clusters 32-38. Alternatively, the functions performed by the channel MCU 80 could be performed by user network MCU 58 through high speed interface 50, or could be performed by the master/logging MCU 90.

A system console 84 provides an interface to the system operator, and a maintenance console 86 provides an interface to a maintenance operator. The consoles 84, 86 are preferably bit-image terminals so as to allow graphical interface displays. All the MCUs and both consoles are connected together via a network interface 88 such as Ethernet. This arrangement allows the maintenance operator to communicate with any of the MCUs from the maintenance console 88, and execute maintenance or diagnostic routines. It also allows a maintenance operator to communicate with system hardware through processor MCUs 62-68, and with the system operating system through channel MCU 80. A system operator also communicates with the system operating system through channel MCU 80.

In addition, information can be gathered from the processor clusters 32-38 and the various peripheral subsystems 40, 42, 48, 52 independently by each of the various MCUs, with the gathered information being collected by the master/logging MCU 90 for storage and analysis. In the event that the master/logging MCU 90 fails, a backup master MCU 92 can be provided. Additionally, each MCU has its own local disk storage on which the information can be stored in the event that neither the master/logging MCU 90 nor the backup master MCU 92 is available.

Each MCU (54, 56, 58, 60, 62, 64, 66, 68, 80, 90, 92) is a workstation or other processor device, and preferably has its own disk storage in the event that both the master/logging MCU 90 and the backup master MCU 92 are unavailable. The MCUs also preferably run the same operating system platform as the processor clusters 32-38 and system development tools (not shown). For example, in the preferred embodiment, the processor clusters 32-38 run a version of the Unix operating system (available from AT&T). In order to obtain the maximum benefit from any diagnostic or maintenance software written, it is desireable to have the design development tools and the MCUs all running the same operating system to increase the portability of the design development tools. Thus, it is desireable to have the MCUs run a version of Unix. In this way, a diagnostic test written (for example, as a Unix shell script) for a development simulator can still be used when actual hardware is available. The topic of having maintenance and diagnostic programs being executable against multiple targets is more fully discussed in the co-pending application entitled INTEGRATED DEVELOPMENT AND MAINTENANCE SOFTWARE SYSTEM. The various subsystems and the processor clusters each can operate as a target against which diagnostic and maintenance routines can be run. These routines can be stored by the master/logging MCU 90 (or any other MCU), and can be controlled through the maintenance console 86.

Those skilled in the art will recognize that there are many variations on the shown example within the scope of the present invention. Specifically, the system or maintenance consoles 84, 86 may appear on the MCU network 88 directly as shown, or may appear attached to an MCU such as the master/logging MCU 90. In addition, other processor and subsystem configurations will require more or fewer MCUs, as determined by the specific system configuration.

One advantage to the maintenance architecture 30 of the present invention is that it allows maintenance operations to be performed on various components of the system with minimal impact of system performance. For example, if an error develops on a disk drive, the disk subsystem MCU 54 reports the error to the master/logging MCU 90 over the MCU network 88. In order to gracefully take the faulty drive off-line, the maintenance operator (or a monitor program executing on an MCU) issues requests to the operating system executing on processor clusters 32-38 through channel MCU 80 to remove the defective drive from its current configuration. The operating system then can proceed to move data off of the defective device onto others, or to terminate processes whose data cannot be moved. When the defective drive is no longer in use, the operating system informs the operator (or the monitor program) that the defective drive is no longer in use and can be taken off line, which can be accomplished through the disk MCU 54. Drive repair or diagnostic routine execution can then proceed, without further interference in processor execution. A reverse procedure brings the drive back on line after repair operations are complete.

A similar procedure allows for the removal of one or more processors from the system, without totally stopping the system. A request to the operating system to remove a specific processor from its multiprocessor configuration results in current and future processes being diverted so as to run without the specific processor. When removed from operation, the operating system informs the operator (or monitor program) that the processor is no longer being used, and may be shut down for repair or for running diagnostic routines.

Figure 3:
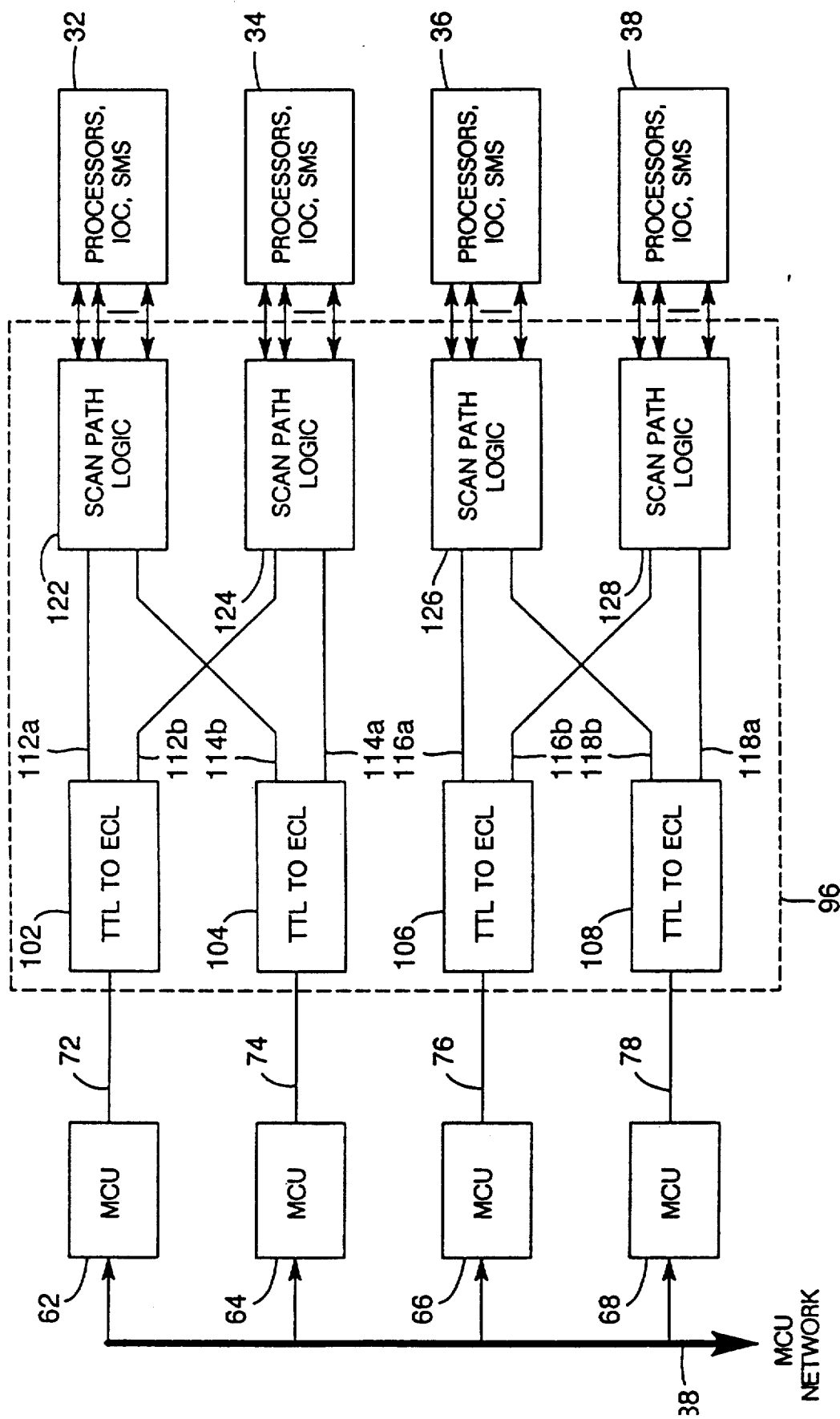
FIG. 3 is a partial block diagram showing the redundant interface between multiple processor MCUs and multiple clusters.

Referring now to FIG. 3, a partial block diagram of the MCU to processor cluster connection is shown. Four processor MCUs 62, 64, 66, 68 are connected to the MCU network 88, and to the LSS control cabinet 96, which in a preferred embodiment is the clock tower 70, or alternately may be a separate cabinet. These four processor MCUs provide access to the hardware associated with four processor clusters 32, 34, 36, 38. Within the LSS control cabinet 96, each MCU 62-68 connects via a TTL interface 72, 74, 76, 78 to a signal converter 102, 104, 106, 108 which converts between the TTL signals of the MCUs 62-68 and the ECL signals of the clusters 32-38. Each signal converter 102-108 has two ports on the ECL side, 112a and 112b, 114a and 114b, 116a and 116b, 118a and 118b, each of which is independently selectable by the MCUs 62-68.

Scan path logic 122, 124, 126, 128 perform the various logic functions associated with scan paths such as address decoding and serializing/deserializing, in a manner known in the art. Pairs of port connections from the signal converters 102-108 connect to scan path logic 122-128 in a cross-coupled fashion so as to provide redundant access to the clusters by the MCUs 62-68. In this way, each MCU 62-68 can access two clusters 32-38, and each cluster 32-38 can be accessed by two MCUs 62-68. Thus if an MCU fails, the cluster it is associated with remains accessible, since another MCU has access to the same cluster. For example, if MCU 62 fails, the scan paths of cluster 32 are accessible by MCU 64 through signal converter 104, port 114b, and scan path logic 122. This redundancy is important, since without it, the failure of a relatively inexpensive MCU would cause an entire cluster of processors to be inaccessible to the maintenance system.

Under the circumstance of a failing MCU, the total bandwidth between MCUs and clusters is reduced since one MCU must now handle two clusters, although all clusters remain available to the maintenance system. The bandwidth is important in error logging. If an error is detected in the clusters, machine state information is saved by the scan paths, and is gathered by the MCUs 62-68. It is important that the information is read from the scan paths by the MCUs 62-68 as quickly as possible, since a subsequent error in the cluster may overwrite the previous error before it can be gathered. For example, if a single bit memory error is detected, the scan paths can latch the entire machine state for subsequent analysis. However, if a subsequent single bit memory error occurs prior to the latched information being gathered by the MCUs, the second error will overwrite the first error. With a failing MCU, gathering scan path information takes longer due to the reduced bandwidth, resulting in a greater likelihood of an overwrite of scan information by a subsequent cluster error. If more bandwidth is required, more MCUs can be added.

Due to the possibility of losing error information due to overwriting by a subsequent error, it is desireable to treat some errors as being more serious than others, and preventing the more serious error from being overwritten at all. For example, single bit memory errors are not fatal to system operation if the Error Correction Code (ECC) of the memory system can correct for single bit errors. However, double bit errors, if they are not ECC correctable, are fatal to system operation. If a double bit error occurs, it is desireable that the scan paths latch the current machine state, and halt the system clocks to prevent overwrite of the error information.

Those skilled in the art will recognize that many variations of the MCU to cluster interconnections are possible within the scope of the present invention. Specifically, if redundant access is not desired, then each signal converter 102-108 would need only one port on the ECL side and there would be no cross coupling. If redundancy was desired but without the loss of bandwidth associated with a single MCU failure, then redundant MCUs could be provided as well. In general, the number of MCU per cluster affects both the overall bandwidth and the redundancy of access to cluster hardware, and can be varied as required by the specific application.

Figure 4:
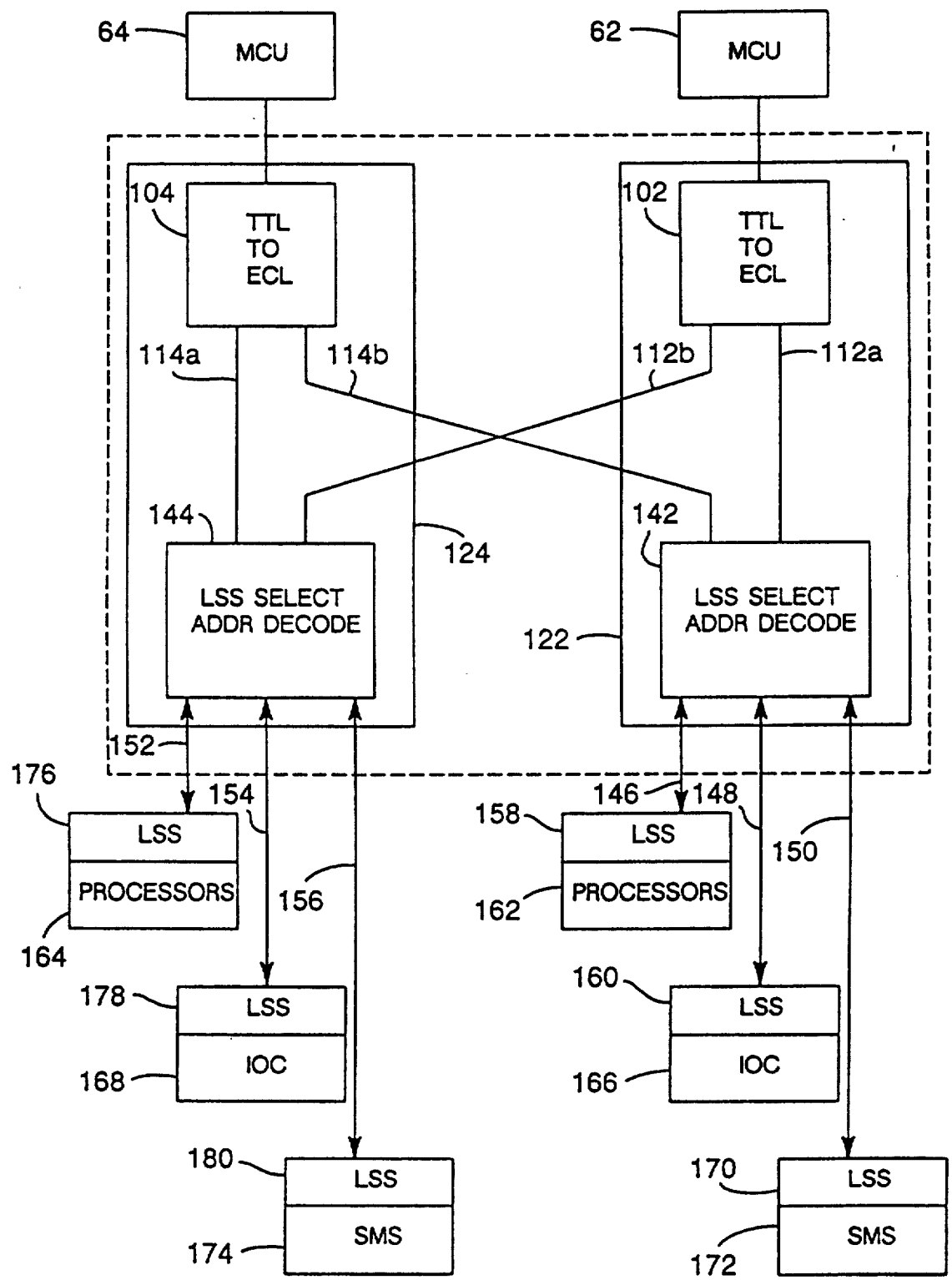
FIG. 4 is a block diagram showing the processor MCUs, the Logic Support Station (LSS) control cabinet, and the scan paths.

Referring now to FIG. 4, a block diagram shows in more detail the interconnections between the processor MCUs, the LSS control cabinet, and the scan paths. MCUs 62 and 64 connect to the scan path logic 122 and 124 which includes signal converters 102 and 104 as previously shown in FIG. 3. Each scan path logic block 122, 124 also includes LSS address decode logic 142, 144. Connected to the LSS address decode logic 142, 144 are multiple groups of two parallel data channels 146, 148, 150, 152, 154, 156 which connect to LSSs 158, 160, 170, 176, 178, 180 which are distributed throughout the various parts of the system. The LSSs connect to the various parts of the system through scan paths (not shown), serializing and deserializing data to and from the scan paths in a manner known in the art. Information being gathered or set via the scan paths is bit shifted serially through the path, to be collected (or initialized) by the LSSs.

Those skilled in the art will recognize that each LSS can support any number of independent scan paths desired, without departing from the scope of the present invention. In addition, the LSS Select decode logic 142, 144 may support any number of data channels and LSSs. The number of scan paths appropriate for a given MCU depends upon the amount of information contained in each scan path, the data bandwidth available for data capture, and how quickly all information must be gathered.

Besides initializing and capturing machine state information, the processor MCUs and the LSSs must also control the system clock, such as being able to start and stop the clock, or to single step or multi-step the clock.

Figure 5:
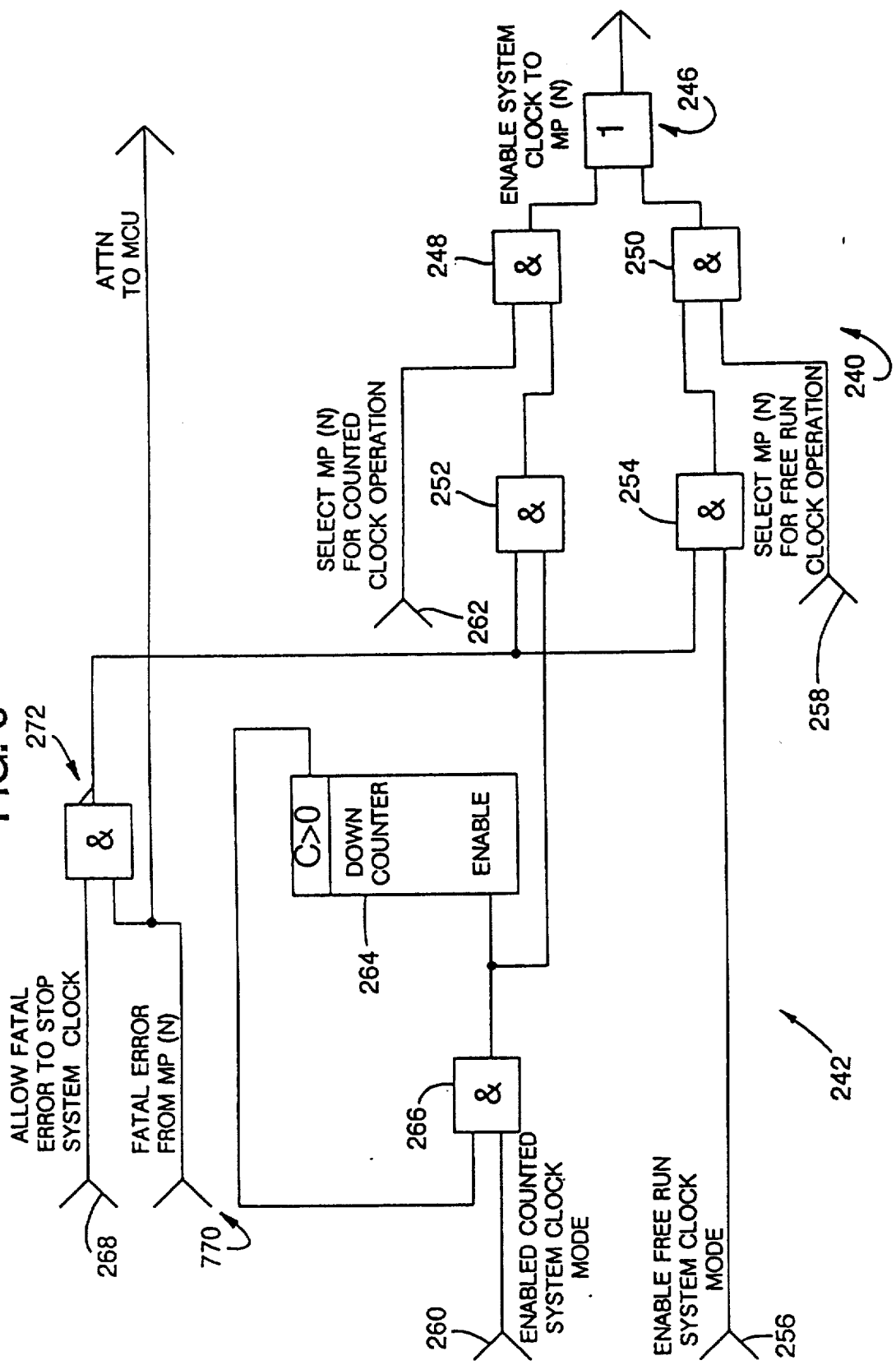
FIG. 5 shows a partial logic diagram of clock control circuitry and error notification circuitry, both of which interact with all MCUs.

Referring now to FIG. 5, a partial circuit diagram is shown, depicting clock control logic and error notification logic. In a preferred embodiment of the present invention, the system is divided into multiple Maintenance Partitions (MPs), each of which is provided with clock control independent of the other MPs. The partitioning is somewhat arbitrary, but each partition should contain related logic so as to make testing of the MP meaningful. In addition, the size of the MP should be large enough to be a testable portion of the system, but small enough to be easily managed.

FIG. 5 shows the clock enable circuit 240 of one MP, and a counter circuit 242 which is common to all MPs. This arrangement allows the clock to be controlled on a per-MP basis. An OR gate 246 enables the clock to the MP if the output of either AND gate 248 or AND gate 250 is at a logical high. And gate 248 outputs a logical high if the MP is selected for counted clock operation, and AND gate 250 outputs a logical high if MP is selected for free running clock operation. In addition to MP specific control, AND gates 252 and 254 allow system wide control over counted clock mode and free running clock mode, respectively.

To allow free running clocks, the system enable for free running clocks 256 must be set, as well as the MP enable for free running clocks 258. These bits are set by programming the appropriate LSS register.

To allow counted clocks, the system enable for counted clocks 260 must be set, as well as the MP enable for counted clocks 262. A counter 264 counts down on system clock edges, and when the count reaches zero, the counted clock enable is turned off by AND gate 266. The enable bits and the counter 264 are also set by programming the appropriate LSS register.

In addition, there is a mechanism for shutting off the clock enables in the event that a fatal error is detected by a MP. If "stop on error" is desired, the stop on error bit 268 is set. When a fatal error occurs 270, NAND gate 272 outputs a logical low, which breaks AND gates 252 and 254, disabling both counted clocks and free running clocks. A separate stop on error bit is provided for each MP. The bit is set by programming the appropriate LSS register.

Figure 6:
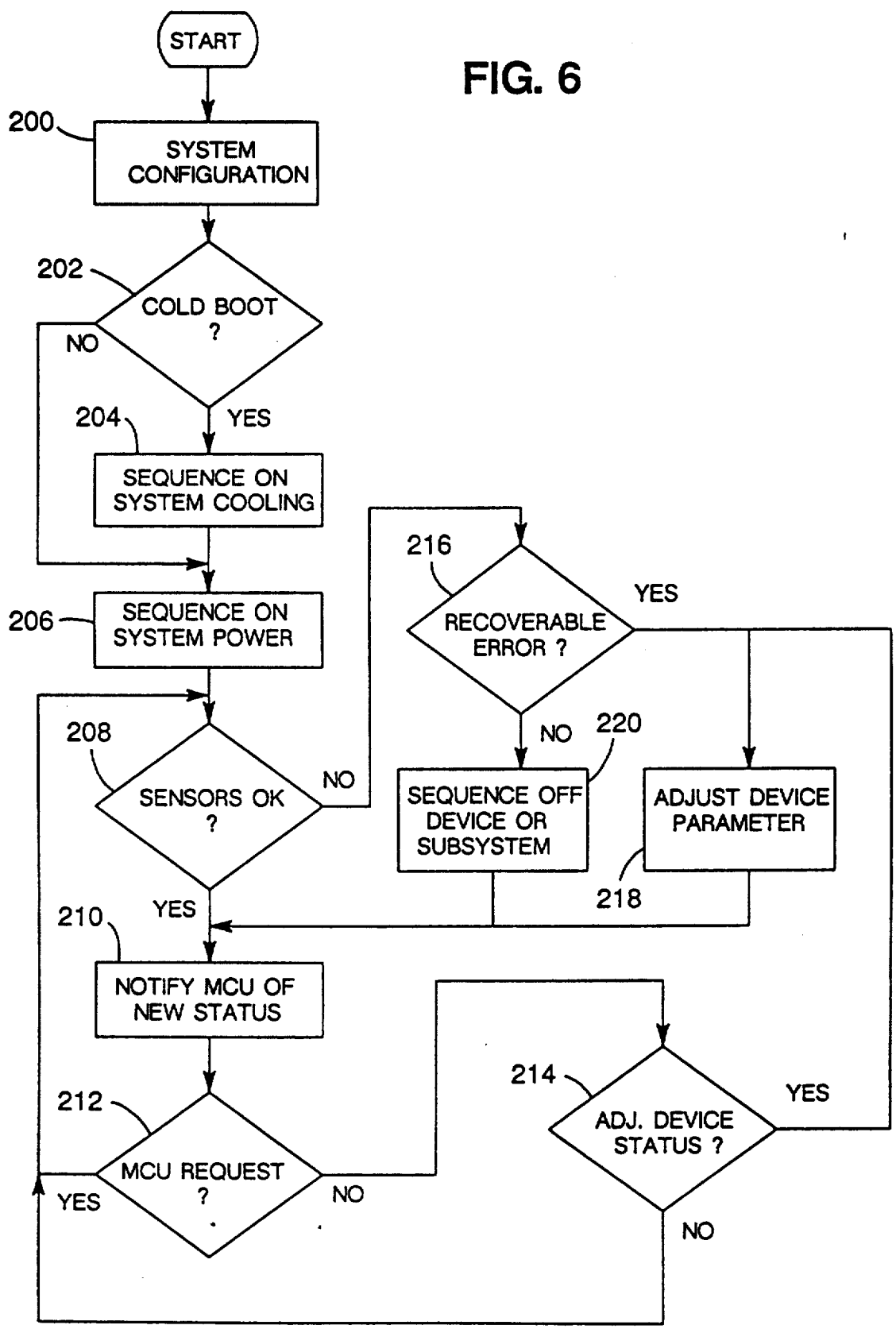
FIG. 6 is a flow chart of a power up sequence which can be controlled by the MCUs according to a preferred embodiment of the present invention.

Referring now to FIG. 6, a flow chart shows an example of a typical operation under the control of the maintenance system MCUs. Specifically, FIG. 6 shows a flow chart of a power sequencing control program to be executed by the power distribution subsystem 52. Communication between this subsystem and other subsystems or the maintenance console 86 occurs through power distribution MCU 60 and the MCU network 88.

Upon entering the control program, the system configuration is read 200 to determine which devices are currently part of the configuration. The configuration file may be stored on the master/logging MCU 90, and updates the operating system through the channel MCU 80 as devices are removed or added to the system configuration. If the system is being powered up cold 202, then the cooling system is sequenced on first 204. System power is then applied 206, and a check of environmental parameters is made 208. If all the environmental sensors are OK, then the power distribution MCU 60 is notified of the status 210. The power distribution MCU is then ready to accept requests from other MCUs 212 to adjust the power up status 214 of various devices. If environmental sensors indicate a failure, the control program attempts to recover 216 by adjusting appropriate device parameters 218, or it powers down the device or subsystem 220 if the error is of the type that cannot be corrected.

The example control program depicted in FIG. 6 is illustrative only, and many other operations may similarly be controlled by interaction of the various MCUs over the MCU network. These operations may be automated as in the above example, or may be under operator control through a menu prompted interactive program.

Those skilled in the art will recognize that while the preferred embodiment contemplates maintenance and control of a highly parallel multiprocessor system, the disclosed architecture could easily be applied to other system types without departing from the scope of the invention. Specifically, the present invention could be applied to systems such as minimally or massively parallel supercomputers, as well as smaller mainframe computers, while still realizing the benefits afforded by the present invention over the prior art.

Although the description of the preferred embodiment has been presented, it is contemplated that various changes could be made without deviating from the spirit of the present invention. Accordingly, it is intended that the scope of the present invention be dictated by the appended claims rather than by the description of the preferred embodiment.

We claim:

1. A control and maintenance subsystem for use with a shared memory multiprocessor computer system, comprising:

two or more computer processors tightly coupled to form said shared memory multiprocessor computer system including at least a first and second maintenance and control unit, each maintenance and control unit operably connected to one or more of said computer processors;

one or more peripheral devices connected to said computer processors, and including a third maintenance and control unit;

a maintenance and control network, connected to said first, second and third maintenance and control units and separate from any connections among said two or more computer processors that form said multiprocessor computer system, each maintenance and control unit including;

a processor means for performing a plurality of maintenance and control operations on one or more devices connected to said maintenance and control unit;

for each of said one or more devices, a scan path logic means for reading and writing scan path chains of information to and from one or more ports accessing internal logic in said device; and an interface means for electronically interfacing said processor means with said scan path logic means for said one or more devices connected to said maintenance and control unit and with said scan path logic means for one or more devices connected to another of said maintenance and control units, such that the scan path logic means for each device is connected to at least two separate maintenance and control units;

a single maintenance console means for interfacing with an operator, wherein said first, second and third maintenance control units and said maintenance console means are all connected to said maintenance and control network to allow communication of maintenance and control information among said first, second and third maintenance control units and said maintenance console means, wherein said internal logic in one or more of said devices is divided into multiple maintenance partitions, each maintenance partition being provided with a clock control circuit for controlling operation of a clock signal for said internal logic of said maintenance partition which is independent from said clock control circuit in any other of said maintenance partitions, such that said processor means can control the operation of said clock signal in each of said maintenance partitions independently from the operation of said clock signal in any other of said maintenance partitions.

2. The maintenance and control subsystem of claim 1 wherein said clock control circuit for each of said maintenance partitions comprises:

a fatal error circuit means for receiving a fatal error input signal from said internal logic of said maintenance partition and an allow fatal error signal from said maintenance control unit and providing a fatal error output signal;

a counter circuit means for providing a counted number of clock cycles as provided by said maintenance control unit when an enable counted clock mode signal is received from said maintenance control unit; and an enable clock circuit means operably connected to said fatal error circuit means and said counter circuit means for enabling said clock signal in said maintenance partition in response to a free running clock signal or said counted clock mode signal provided by said maintenance control unit and the absence of said fatal error output signal.

3. A control and maintenance subsystem for use in a highly parallel supercomputer, comprising:

a plurality of computer processors physically organized into two or more clusters and connected in a highly parallel configuration;

a plurality of processor maintenance and control units, wherein each of said processor maintenance and control units is connected to and associated with a unique one of said clusters of computer processors and each maintenance and control unit includes:

a processor means for performing a plurality of maintenance and control operations on one or more devices connected to said maintenance and control unit;

for each of said one or more devices, a scan path logic means for reading and writing scan path chains of information to and from one or more ports accessing internal logic in said device; and an interface means for electronically interfacing said processor means with said scan path logic means for said one or more devices connected to said maintenance and control unit and with said scan path logic means for one or more devices connected to another of said maintenance and control units, such that the scan path logic means for each device is connected to at least two separate maintenance and control units;

a peripheral device subsystem connected to said plurality of computer processors;

a peripheral maintenance and control unit connected to said peripheral device subsystem;

a power distribution means connected to said plurality of said processor means and said peripheral device subsystem for controlling power sequencing of said processor means and said peripheral device subsystem;

a power maintenance control unit connected to said power distribution means;

a maintenance and control network, connected to said plurality of processor maintenance and control units, said peripheral maintenance and control unit and said power maintenance and control unit and separate from any connections among said plurality of computer processors that form said two or more clusters of said supercomputer system;

a system console means for interfacing with an operator, wherein said processor, peripheral, and power maintenance control units and said system console means are all connected together to said maintenance and control network to allow communication of maintenance and control information between said processor, peripheral, and power maintenance control units and said system console means, wherein said internal logic in one or more of said devices is divided into multiple maintenance partitions, each maintenance partition being provided with a clock control circuit for controlling operation of a clock signal for said internal logic of said maintenance partition which is independent from said clock control circuit in any other of said maintenance partitions, such that said processor means can control the operation of said clock signal in each of said maintenance partitions independently from the operation of said clock signal in any other of said maintenance partitions.

4. The maintenance and control subsystem of claim 3 wherein said clock control circuit for each of said maintenance partitions comprises:

a fatal error circuit means for receiving a fatal error input signal from said internal logic of said maintenance partition and an allow fatal error signal from said maintenance control unit and providing a fatal error output signal;

a counter circuit means for providing a counted number of clock cycles as provided by said maintenance control unit when an enable counted clock mode signal is received from said maintenance control unit; and an enable clock circuit means operably connected to said fatal error circuit means and said counter circuit means for enabling said clock signal in said maintenance partition in response to a free running clock signal or said counted clock mode signal provided by said maintenance control unit and the absence of said fatal error output signal.

* * * * *